United States Patent [19]

Yamada et al.

[11] 4,449,803
[45] May 22, 1984

[54] INDICATING APPARATUS FOR ELECTRONIC FLASH SYSTEM OF TTL LIGHT MEASUREMENT TYPE

[75] Inventors: Masanori Yamada; Akira Hiramatsu, both of Kanagawa, Japan

[73] Assignee: Canon Kabushiki Kaisha, Tokyo, Japan

[21] Appl. No.: 319,618

[22] Filed: Nov. 9, 1981

[30] Foreign Application Priority Data

Nov. 13, 1980 [JP] Japan .................................. 55-159906

[51] Int. Cl.³ .............................................. G03B 7/16
[52] U.S. Cl. ................................. 354/416; 354/127.1; 354/476
[58] Field of Search ............... 354/33, 60 F, 127, 128, 354/59

[56] References Cited

U.S. PATENT DOCUMENTS

| | | | |
|---|---|---|---|
| 4,193,677 | 3/1980 | Hasegawa et al. | 354/127 |
| 4,230,402 | 10/1980 | Uchiyama et al. | 354/128 |
| 4,351,600 | 9/1982 | Hasegawa et al. | 354/128 |

Primary Examiner—Russell E. Adams
Attorney, Agent, or Firm—Toren, McGeady and Stanger

[57] ABSTRACT

An annunciating apparatus for use with an electronic flash system includes a flash system which employs a trigger device generating a trigger signal at a time of test light emission and a light producing device responsive to the trigger signal for initiating operation of the light producing device to produce light. The annunciating apparatus includes a light sensitive device arranged to receive light passed through a photographic taking lens and produces a first electrical signal corresponding to an amount of light from a scene. The annunciating apparatus also includes a signal generating device for producing a second electrical signal corresponding to an aperture value preset on a camera at the time of test light emission for the electronic flash system and a comparison device for receiving the first and second signals to produce a control signal when the first electrical signal reaches a predetermined level. Finally, an annunciator responsive to the control signal annunciates whether a correct exposure obtains.

8 Claims, 4 Drawing Figures

INDICATING APPARATUS FOR ELECTRONIC FLASH SYSTEM OF TTL LIGHT MEASUREMENT TYPE

BACKGROUND OF THE INVENTION

1. Field of the Invention

This invention relates to an electronic flash system and more particularly to an indicating apparatus for an electronic flash system of the TTL light measurement type (1) to measure light which is emitted from an electronic flash unit and comes through the photograph taking lens of a camera and (2) to have the amount of illuminating light with which an object is to be photographed be controlled on the basis of the output of the light measurement.

2. Description of the Prior Art

Heretofore, electronic flash photographic systems of the above stated TTL light measurement type have been proposed and have been available in the market. Furthermore, there has also been proposed an electronic flash photographic unit (hereinafter called an electronic flash unit) of the TTL light measurement type which produces an illumination terminating signal and indicates when the signal is produced informing the photographer that a suitable amount of exposure is possible, i.e. for indicating that the object to be photographed is within a range in which the object is photographable.

However, in such a flash unit, the camera does not perform any stopping down action at the time of test light emission, that is, before a flash photographing operation is actually carried out. As a result, no information on the aperture position of the camera is introduced into the flash unit. Therefore, it has been impossible to indicate whether or not the object to be photographed is within the photographable range at the time of test light emission.

To obviate this shortcoming of conventional systems, a Japanese Patent Application, Laid-open No. 55-40413, has proposed an electronic flash system of the TTL light measurement type in which there is provided a member for setting the aperture of the camera and the diaphragm aperture of a photograph taking lens is stopped down to a predetermined aperture value at the time of test light emission in such a way as to indicate whether or not the object to be photographed is within the photographable range at the time of the light emission test. The method proposed, however, has been inconvenient because it necessitates a stopping down operation at the time of the light emission test.

It is an object of this invention to provide an indicating apparatus for an electronic flash system of the TTL light measurement type capable of eliminating the shortcomings of the prior art arrangements.

It is another object of the invention to provide an indicating apparatus of simple construction for an electronic flash system.

These and further objects, features and advantages of the invention will become apparent from the following detailed description thereof with the accompanying drawings.

DESCRIPTION OF THE PREFERRED EMBODIMENT

Figure 1:
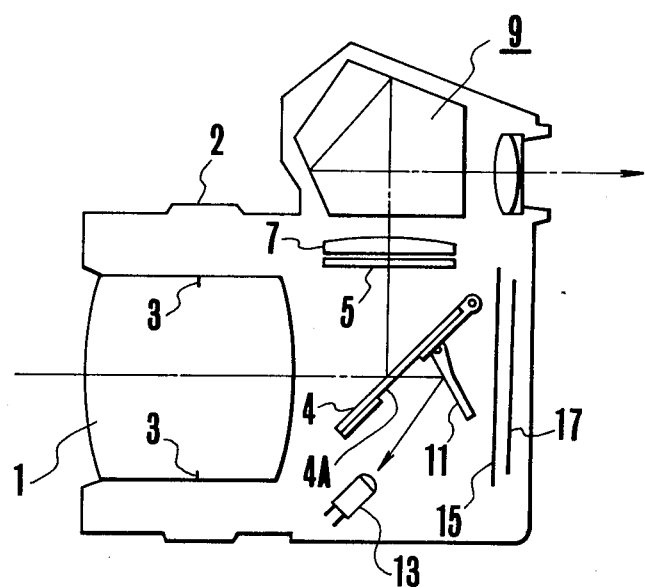
FIGS. 1 and 2 are schematic illustrations of a camera system to which the present invention is applied.
Figure 2:
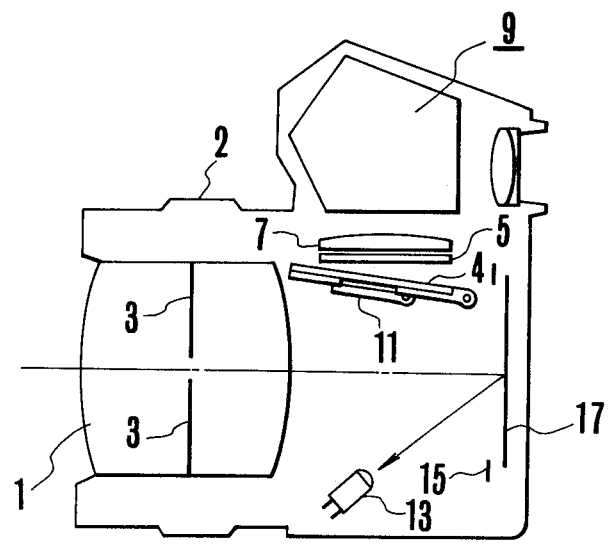

The structural arrangement of a camera system to which the present invention is applied is schematically shown in FIGS. 1 and 2. FIG. 1 shows the conditions of the camera components before a flash photographing operation and at the time of the light emission test. FIG. 2 shows the conditions of the camera components during a flash photographing operation.

Referring to FIG. 1, the camera includes a photograph taking lens 1; a diaphragm 3, a quick return mirror 4 which has its light permeable mirrored middle portion; a focusing screen 5; a condenser lens 7; a penta prism 9 to guide incident light from an object to be photographed to a view finder as the incident light passes through the diaphragm 3 of the photograph taking lens 1 to be reflected by the quick return mirror 4 and further passes through the focusing screen 5 and the condenser lens 7. A sub-mirror 11 is pivotally connected to the reverse side of the mirror 4 and is swingable to guide the incident light after it has passed through the middle portion 4A of the mirror 4 to a light sensitive element 13. The apparatus also includes shutter curtains 15 and a film 17.

Furthermore, the transmission factor, etc. of the light permeable mirrored portion 4A of the quick return mirror 4, etc. have the light sensitive element 13 receive about the same amount of light from the same object under both conditions shown in FIGS. 1 and 2.

Figure 3:
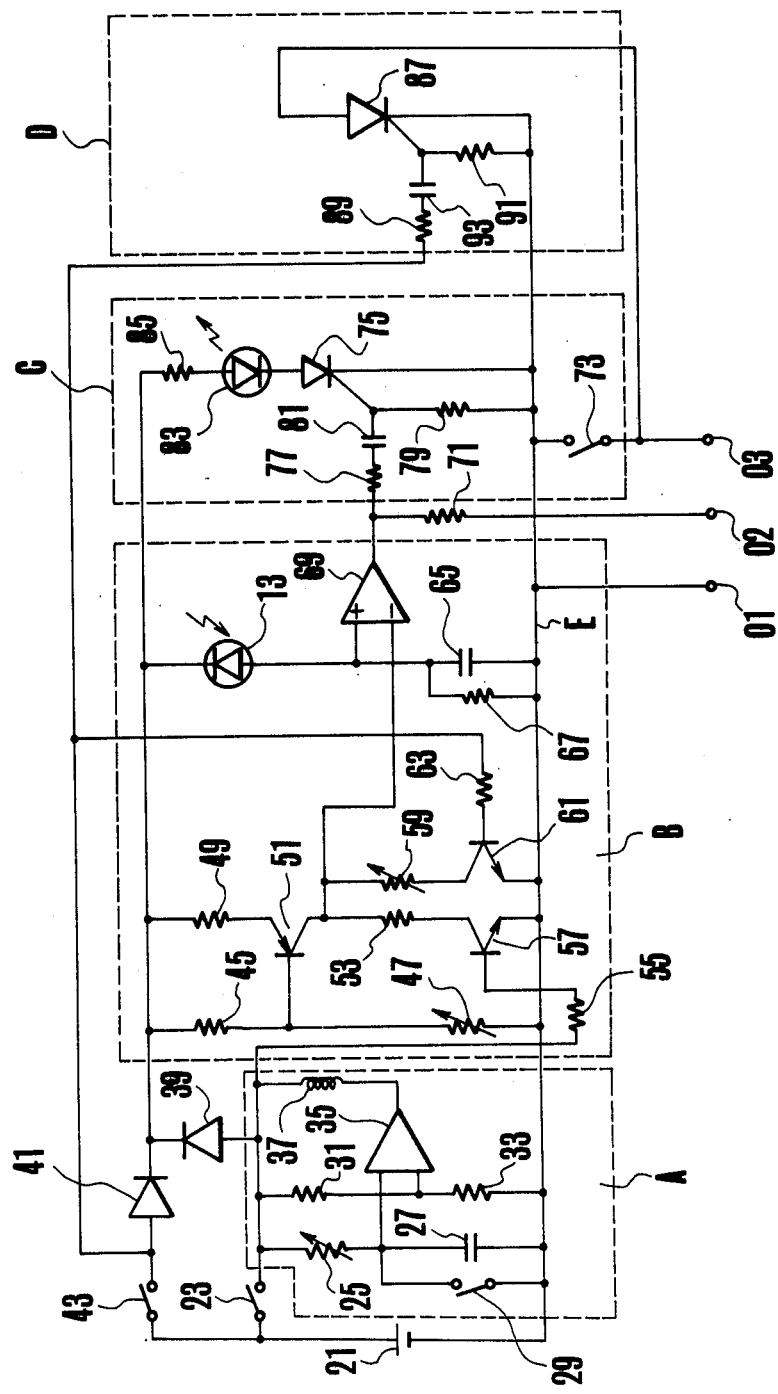
FIG. 3 is an electric circuit diagram of the camera system shown in FIG. 1.
Figure 4:
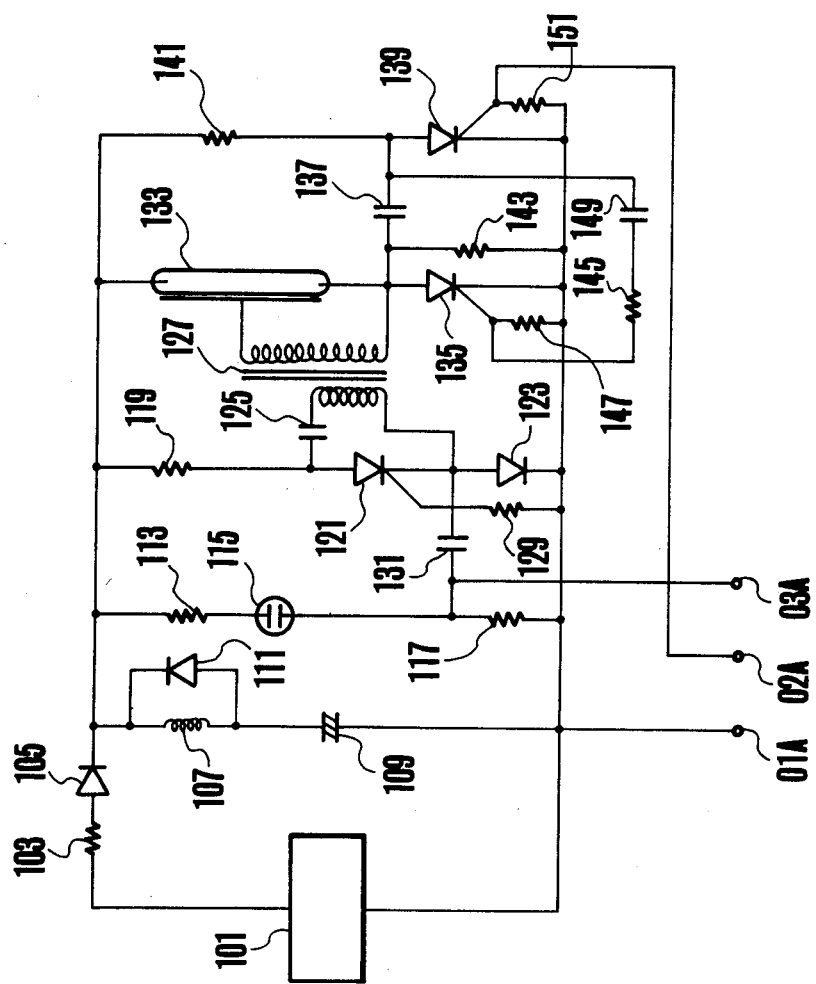
FIG. 4 is an electric circuit diagram of a light adjusting flash unit included in the system of FIG. 1.

FIG. 3 is an electric circuit diagram showing an electrical circuit arrangement provided within the camera system shown in FIG. 1. FIG. 4 is an electric circuit diagram showing an electrical circuit arrangement of a light adjusting flash unit of the camera system shown in FIG. 1. Referring to FIG. 3, a shutter control circuit encompassed with a dotted line A is connected to a power source battery 21 through a power source switch 23. This circuit includes a variable resistor 25 provided for adjusting the shutter time in accordance with a flash light; a time constant capacitor 27; a short circuit switch 29 to open in association with the travel of a leading curtain of the shutter; resistors 31 and 33 forming a voltage dividing circuit; a comparator 35; and a magnet coil 37 connected to the output terminal of the comparator 35 to control a trailing curtain of the shutter. A circuit encompassed with a dotted line B is a light measuring circuit which is selectively connected to the battery 21 through a diode 39 and the power source switch 23 or through a diode 41 and a normally open test light emission switch 43. In this light measuring circuit B are provided a resistor 45 which forms a voltage dividing circuit jointly with another resistor 47, the latter resistor 47 being a variable resistor for setting film sensitivity; a pnp transistor 51 which has the emitter thereof connected to a resistor 49 and the base thereof to the variable resistor 47 of the voltage dividing circuit; an npn transistor 57 which has its collector connected to the collector of the transistor 51 and its base to the power source switch 23 through a resistor 55; a variable resistor 59 for setting an aperture, the value of the aperture setting variable resistor 59 varying as the aperture presetting ring 2 of the camera (see FIG. 1) is rotated; an npn transistor 61 which has its collector connected to the variable resistor 59 and its base to the switch 43 through a resistor 63; and a light sensitive element 13 which is disposed in the position shown in FIG. 1. At the time of observation and test light emission as shown in FIG. 1, the light sensitive element 13 measures light coming from the object to be photographed as the light comes through the photographing lens 1, the diaphragm 3 which is in a full open state, and light permeable mirrored the portion 4A of the quick return mirror 4 and is reflected by the sub-mirror 11. At the time of flash photography as shown in FIG. 2, the light sensitive element 13 measures the light from the object as observed through the photographing lens 1 and the aperture of the diaphragm 3, the aperture of which has been stopped down to a preset aperture value, and which is reflected from the film surface 17. The light sensitive element 13 is a photo diode or the like. The light measurement circuit B further includes an integrating capacitor 65; a discharge resistor 67 which is connected in parallel with the capacitor 65; and a comparator 69. A grounding terminal 01 is connected to a grounding line E. An output terminal 02 for producing an illumination terminating signal is connected to the output terminal of the comparator 69 through a resistor 71. Meanwhile, an illumination start signal output terminal 03 is connected to the grounding line E through a known synchronization contact 73.

A circuit encompassed with a dotted line C is an indicator circuit. The indicator circuit includes a thyristor 75 which is provided with a gate connected to the output terminal of the comparator 69 through a capacitor 81 and a resistor 77; a resistor 79 connected in parallel between the gate and the cathode of the thyristor 75; a light emitting diode 83 connected to the anode of the thyristor 75 and indicates that the object to be photographed is within a photographable range; a current limiting resistor 85 connected to the light emitting diode 83; and the above synchronization contact 73.

A circuit encompassed with a dotted line D is a starting circuit, which includes: a thyristor 87 connected in parallel with the synchronization contact 73; resistors 89 and 91; and another capacitor 93 connected to the switch 43 through the resistor 89.

Referring now to FIG. 4, the electronic flash unit is provided with terminals 01A, 02A and 03A connected to the above terminals 01, 02 and 03 of the camera when the flash unit is mounted on the camera as shown in FIG. 1; a high voltage power source 101 which includes a known boosting circuit; a rectifying diode 105 connected to the output terminal of the high voltage power source 101; a main capacitor 109 which is connected to the cathode of the diode 105 through a coil 107; a diode 111 parallel connected in parallel with the coil 107; resistors 113 and 117; a neon tube 115 for indicating completion of charging the main capacitor 109; a resistor 119; a thyristor 121 which forms a trigger circuit; a diode 123 connected between the cathode of the thyristor 121 and a grounding line; a trigger capacitor 125; a trigger transformer 127; a resistor 129 connected to the gate of the thyristor 121 and the grounding line; a capacitor 131 which is charged through the neon tube 115 and the resistor 113; a discharge tube 133; a main thyristor 135 which is connected in series with the discharge tube 133; a sub-thyristor 139 which is connected in parallel with the main thyristor 135 through a commutation capacitor 137; resistors 141 and 143 which are provided for charging the commutation capacitor 137 and series connected in series with the commutation capacitor 137; resistors 145 and 147; a capacitor 149; and a resistor 151.

Again referring to FIGS. 1 through 4, the camera system as described in the foregoing operates in the following manner:

In ordinary flash photography, a desired aperture value is first preset at the aperture preset ring 2 of the camera. After that, when a release button (not shown) of the camera is depressed, the power source switch 23 is closed. Then, a driving voltage is impressed from the battery 21 onto the shutter control circuit A. At the same time, a driving voltage is also impressed on the light measuring circuit B and the indicator circuit C from the battery 21 through the diode 39. Each circuit is thus rendered operative. When the diaphragm aperture 3 of the camera is stopped down by a known method to the above preset aperture value, the leading curtain of the shutter move. In response to this travel, the switch 29 opens and the time constant capacitor 27 is charged through the variable resistor 25 which provides a shutter time suited for flash photography. When the capacitor 27 is charged to a given voltage value which is determined by the voltage dividing ratio of the resistors 31 and 33, the current supply to the coil 37 of the magnet is cut off by the output of the comparator 35 performing a shutter closing action. On the other hand, since the switch 43 is open during an ordinary flash photographying operation, the transistor 61 does not receive any base current through the resistor 63 and thus remains off. In the meantime, the transistor 57 is on because it receives a base current through the resistor 55.

Accordingly, the divided voltage of the film sensitivity setting variable resistor 47 and the resistor 45 is applied to the emitter of the transistor 51. Then, a current determined by this divided voltage and the resistor 49 flows as collector current. Thus, the collector of the transistor 51 produces a voltage determined by the collector current and the resistor 53. This voltage is transmitted to the negative input terminal of the comparator 69. When the shutter is fully opened and the synchronization contact 73 is closed, a signal representative of this closing comes through the terminals 03 disposed on the side of the camera and the terminal 03A disposed on the side of the flash unit to drive a known trigger circuit formed by the resistors 113, 117, 129 and 119, capacitors 131 and 125, the neon tube 115, the diode 123, the thyristor 121 and the trigger transformer 127. With the trigger circuit driven in this manner, the flashing discharge tube 133 is ionized. A change in the cathode voltage of the flashing discharge tube 133 is transmitted through the commutation capacitor 137, the capacitor 149 and the resistor 145 to the gate electrode of the main thyristor 135. The main thyristor 135 is rendered conductive by this. As a result, the electric charge accumulated at the main capacitor 109 causes a flashing current to flow through the coil 107, the flashing discharge tube 133 and the main thyristor 135 and flashing begins.

A flash light thus emitted is reflected by the object to be photographed. The reflection light from the object comes through the diaphragm aperture which is being actually used and is received by the photo diode which is in the position shown in FIG. 2. The capacitor 65 then performs an integrating action on the photocurrent produced by the photo diode 13. When the charging voltage of the capacitor 65 becomes higher than the negative input of the comparator 69, the output voltage of the comparator 69 increases. The output voltage then renders the thyristor 75 conductive through the resistor 77 and the capacitor 81 and, at the same time, causes the light emitting diode 83 to light up indicating that the object is within the photographable range. Meanwhile, through the resistor 71, the terminal 02 disposed on the side of the camera and the terminal 02A disposed on the side of the flash unit, the above output voltage of the comparator 69 is applied to the gate electrode of the sub-thyristor 139. With the output voltage of the comparator 69 applied to the gate electrode of the sub-thyristor, the known flash control circuit consisting of the main thyristor 135, the sub-thyristor 139, the commutation capacitor 137, the capacitor 149, the resistor 147, 143, 141 and 145 is driven to stop the flash light emission.

In ordinary flash photography, as described in the foregoing, when the time integration value of the film surface illumination by the reflection light of the flash light coming from the object to be photographed reaches a given value, determined by information on the sensitivity of the film, flashing is controlled to give an adequate exposure to the film. In addition to this, when the indicating means 83 is driven, it is an indication that the object is adequately covered by flash light exposure or that the object has been within the photographable range.

In some cases confirmation must be made as to whether an object to be photographed is within the photographable range or not before carrying out a flash photographing operation. In this case of so-called test light emission, the camera system operates in the following manner.

The aperture preset ring 2 of the camera is set at a desired aperture value in the same manner as in ordinary flash photography. Then, the resistance value of the resistor 59 varies as the preset ring 2 is turned and the resistor 59 is thus set at the same aperture value as the value set at the preset ring 2. When the switch 43 is closed, the voltage of the battery 21 is applied to the gate of the thyristor 87 to render the thyristor 87 conductive. Then, a conduction signal is applied to the known trigger circuit through the terminal 03 provided on the side of the camera and the terminal 03A provided on the side of the flash unit. As a result, the emission of a flash light begins in the same manner as described above. Reflected flash light from the object to be photographed is then received, through the photograph taking lens 1, the diaphragm aperture 3 which is fully open, the half mirror portion 4A of the mirror 4 and the sub-mirror 11, by the photo diode 13 which is in the position shown in FIG. 1. The capacitor 65 performs an integrating action on the photo-current of the light sensitive element or photo diode 13. In this instance, since the test light emission switch 43 is closed, the transistor 61 is turned on by a base current flowing through the resistor 63. Since the switch 23 is open at the time of test light emission, the transistor 57 has no base current flowing through the resistor 55 and, therefore, is off.

Therefore, the divided voltage of the film sensitivity information setting variable resistor 47 and the resistor 45 is applied to the emitter of the transistor 51. Then, at the transistor 51 collector, there is produced a voltage determined by the product of the resistance value of the variable resistor 59 corresponding to the preset aperture value and the collector current of the transistor 51 determined by the resistor 49. This voltage is conducted to the negative input terminal of the comparator 69. With an integrating action performed in the above manner, when the charging voltage of the capacitor 65 becomes higher than the negative input of the comparator 69, the output of the comparator 69 rises. This output voltage of the comparator 69 is applied to the gate of the thyristor 75 through the resistor 77 and the capacitor 81 to make the thyristor conductive. The indicating light emitting diode 83 then lights up to indicate that the object to be photographed is within the photographable range and that an adequate degree of exposure can be obtained by a flash photographing operation. Concurrently, the above output voltage of the comparator 69 is applied to the gate of the thyristor 139 through the resistor 71, the terminal 02 disposed on the side of the camera and the terminal 02A disposed on the side of the flash unit. Then, the known flash control circuit is driven and flash light emission is stopped.

The resistance value of the above variable resistor 59 satisfies the following formula with the sensitivity of the film used at the time of test light emission remaining unchanged for an ordinary flash photographing operation:

$$Vf = Vfo \cdot 2^{f-fo} \tag{1}$$

wherein the negative input potential Vfo of the comparator 69 is determined by the film sensitivity information setting resistor 47 during an ordinary flash photographing operation; the negative input potential Vf of the comparator 69 is determined by the film sensitivity information setting resistor 47 and the aperture information setting variable resistor 59 at the time of test light emission; the aperture value f is preset at the aperture preset ring 2; and the maximum aperture value of the diaphragm 3 is represented by fo.

In other words, illumination of the surface of the light sensitive element 13 obtained at the time of ordinary flash photography coincides with the light sensitive element surface illumination obtained at the time of test light emission.

As long as the condition expressed by Formula (1) is satisfied, the flash light is measured at the time of test light emission with the diaphragm aperture fully open, as shown in FIG. 1, irrespective of the preset aperture value; and, when a flash photographing operation is actually carried out with the diaphragm aperture stopped down to the preset aperture value, the light sensitive element receives the same quantity of light as that received by the element at the time of test light emission.

Light measurement is carried out at the time of test light emission with the diaphragm aperture fully open, as shown in FIG. 1. The quantity of light received in this manner is unvarying when an actual flash light photographing operation is carried out under the condition shown in FIG. 2. Confirmation of an illuminated indicating element 83 as the result of test light emission, therefore, enables the photographer to know whether the object to be photographed is within the photographable range before a flash photography operation.

The electronic flash system, according to the invention, thus enables the photographer to know beforehand whether the object to be photographed is within the photographable range by means of an aperture value presetting operation which is always required for flash photography, without necessitating an aperture stopping down operation. The operability of the camera system, therefore, can be greatly improved. Furthermore, it is another advantage of the invention that the arrangement is also applicable to a camera in which the structural arrangement does not require inclusion of a stopping-down operating member.

What is claimed is:

1. An annunciating apparatus for use with an electronic flash system, said flash system including trigger means for generating a trigger signal at a time of test light emission, and a light producing means responsive to the trigger signal for initiating the operation of said light producing means whereby light is emitted therefrom, said annunciating apparatus comprising:
   (a) light sensitive means arranged to receive light passed through a photographic taking lens and being operative to produce a first electrical signal corresponding to an amount of light from a scene;
   (b) signal generating means for producing a second electrical signal corresponding to an aperture value preset on a camera at the time of light emission for said electronic flash system;
   (c) comparison means for receiving said first and second electrical signals and for producing a control signal when said first electrical signal has reached a predetermined level; and
   (d) annunciating means responsive to said control signal and for annunciating whether a correct exposure obtains.

2. An annunciating apparatus according to claim 1, wherein said signal generating means includes an impedance member which is associated with an aperture preset ring of the camera.

3. An annunciating apparatus according to claim 2, wherein said impedance member includes a variable resistor which has the resistance value thereof vary with the rotating extent of said aperture preset ring.

4. An annunciating apparatus according to claim 1, wherein said comparison means includes a comparator which is provided with a first input terminal for receiving said first electrical signal and a second input terminal for receiving said second electrical signal.

5. An annunciating apparatus for use with an electronic flash system, said flash system including trigger means for generating a trigger signal at a time of test light emission, and a light producing means responsive to the trigger signal for initiating the operation of said light producing means whereby light is emitted therefrom, said annunciating apparatus comprising:
   (a) light sensitive means arranged to receive light passed through the photographic taking lens and being operative to produce a first electrical signal corresponding to an amount of light from said scene;
   (b) signal generating means for producing a second electrical signal corresponding to an aperture value preset on a camera at the time of test light emission for said electronic flash system;
   (c) comparison means for receiving said first and second electrical signals and for producing a control signal when said first electrical signal has reached a predetermined level;
   (d) light terminating means responsive to said control signal for initiating the operation of said light terminating means whereby said emitted light is terminated; and
   (e) annunciating means responsive to said control signal and for annunciating whether a correct exposure obtains.

6. An annunciating apparatus according to claim 5, wherein said signal generating means includes a impedance member which is associated with an aperture preset ring of the camera.

7. An annunciating apparatus according to claim 6, wherein said impedance member includes a variable resistor which has the resistance value thereof vary with the rotating extent of said aperture preset ring.

8. An annunciating apparatus for use with an electronic flash system, said flash system including trigger means for generating a trigger signal at the time of test light emission, and a light producing means responsive to the trigger signal for initiating the operation of said light producing means whereby light is emitted therefrom, said annunciating apparatus comprising:
   (a) light sensitive means arranged to receive light passed through the photographic taking lens with an aperture at full open state and being operative to produce a first electrical signal corresponding to an amount of light from said scene;
   (b) signal generating means for producing a second electrical signal corresponding to an aperture value preset on a camera at the time of test light emission for said electronic flash system;
   (c) comparison means for receiving said first and second electrical signals and for producing a control signal when said first electrical signal has reached a predetermined level; and
   (d) annunciating means responsive to said control signal and for annunciating whether a correct exposure obtains.

* * * * *